United States Patent [19]

Yamaoka et al.

[11] Patent Number: 4,961,483

[45] Date of Patent: Oct. 9, 1990

[54] VARIABLE DAMPING CHARACTERISTICS SHOCK ABSORBER WITH FEATURE OF GENERATION OF PISTON STROKE DIRECTION INDICATIVE SIGNAL

[75] Inventors: Fumiyuki Yamaoka; Shinobu Kakizaki; Shigeru Kikushima, all of Kanagawa, Japan

[73] Assignee: Atsugi Motor Parts, Limited, Tokyo, Japan

[21] Appl. No.: 388,006

[22] Filed: Aug. 1, 1989

[30] Foreign Application Priority Data

Aug. 3, 1988 [JP] Japan .................. 63-195154
Aug. 3, 1988 [JP] Japan ............... 63-103606[U]

[51] Int. Cl.⁵ ........................................... F16F 9/50
[52] U.S. Cl. ................... 188/299; 188/285; 280/707
[58] Field of Search ............ 188/267, 286, 299, 314; 123/90.11, 90.48; 267/218; 280/707

[56] References Cited

U.S. PATENT DOCUMENTS 4,673,067 6/1987 Münning et al. ............. 188/299
4,729,459 3/1988 Inagaki et al. ............... 188/299

FOREIGN PATENT DOCUMENTS 2607238 9/1976 Fed. Rep. of Germany ...... 188/267
61-85210 3/1986 Japan .

Primary Examiner—Duane A. Reger
Attorney, Agent, or Firm—Ronald P. Kananen

[57] ABSTRACT

A variable damping characteristics shock absorber includes a piezoelectric transducer which is responsive to piston stroke for producing a piston stroke indicative signal. The piston stroke indicative signal includes component indicative of piston strike direction so as to enable control of the damping characteristics depending upon the piston stroke direction.

10 Claims, 10 Drawing Sheets

VARIABLE DAMPING CHARACTERISTICS SHOCK ABSORBER WITH FEATURE OF GENERATION OF PISTON STROKE DIRECTION INDICATIVE SIGNAL

BACKGROUND OF THE INVENTION

1. Field of the Invention

The present invention relates generally to a variable damping characteristics shock absorber assembly which is variable of damping characteristics and suitable to employ in an automotive suspension system. More specifically, the invention relates to a shock absorber which is provided a capability of generating an electric signal indicative of a piston stroke direction.

2. Description of the Background Art

In the recent automotive technologies, respective automotive components have been required high performance and high response. In case of a suspension system, it has been required high level of riding comfort and driving stability. In order to achieve both of high level riding comfort and high level driving stability, high response against vibration input to the suspension system has been required.

One of the typical variable damping force suspension system has been disclosed in Japanese Patent First (unexamined) Publication (Tokkai) Showa No. 61-85210. In the disclosed system, a piezoelectric element is disposed in each shock absorber in each suspension system for detecting variation of fluid pressure in the shock absorber. A control unit is provided for receiving an input indicative of the fluid pressure provided from the piezoelectric element. The control unit outputs a controlled voltage to the piezoelectric element for switching operation mode of the shock absorber at least between SOFT mode in which smaller damping force is to be generated in response to vibration input and HARD mode in which greater damping force is to be generated in response to vibration input.

In general, the control unit is responsive to low frequency input vibration which induces attitude change of the vehicle body to switch the operational mode of the shock absorber into HARD mode for a given period of time. While the shock absorber is maintained at the HARD mode, the piezoelectric element maintains operation as an actuator for maintaining HARD mode operation of the shock absorber Therefore, while it is active as the actuator, the piezoelectric element can not monitor fluid pressure.

In the modern technology of suspension control, it has been considered that varying of damping characteristics of shock absorber between a piston compression stroke in response to bounding motion between the vehicle body and a road wheel and a piston expansion stroke in response to rebounding motion between the vehicle body and the road wheel in order to obtain better vibration stabilizing performance. Therefore, it is desirable to adjust the damping characteristics of the shock absorber depending upon the mode of piston action. In order to realize this, it is essential to detect the piston action mode on the basis of variation of the fluid pressure in the shock absorber. However, as set forth above, since the piezoelectric element is held in operative as the fluid pressure sensing element while the shock absorber is maintained at the HARD mode.

This may cause problem in damping shocks. For example, when the damping characteristics in the HARD mode is set to generate relatively great damping force in response to vibration input, damping force generated in response to piston compression mode action can amplify the input vibration. This tendency may be significant for the second and subsequent vibration cycles. This clearly degrades vibration stabilizing performance of the vehicle to provide rough ride feeling.

Therefore, it is desirable to provide soft damping characteristics in response to piston compression stroke and to provide hard damping characteristics in response to piston expansion stroke. For achieving this, it becomes essential to detect direction of piston stroke.

SUMMARY OF THE INVENTION

Therefore, it is an object of the present invention to provide a shock absorber which is provided a capability of outputting signals indicative of a piston stroke direction.

In order to accomplish aforementioned and other objects, a variable damping characteristics shock absorber, according to the present invention, includes a piezoelectric transducer which is responsive to piston stroke for producing a piston stroke indicative signal. The piston stroke indicative signal includes component indicative of piston strike direction so as to enable control of the damping characteristics depending upon the piston stroke direction.

According to one aspect of the invention, a variable damping characteristics shock absorber comprises:

a hollow cylinder defining therein an internal space;

a piston assembly disposed within the internal space of the cylinder for defining first and second working chambers;

a communication path means, incorporated in the piston assembly, for communicating the first and second working chambers, the communication means including a first path active during piston bounding stroke for establishing fluid communication between the first and second working chambers and a second path active during piston rebounding stroke for establishing fluid communication between the first and second working chambers;

a first valve means associated with the first path, responsive to pressure difference between the first and second working chambers during piston bounding stroke, for forming a controlled area of a first fluid flow gap, which area of the first fluid flow gap being variable depending upon the magnitude of pressure difference between the first and second working chambers;

a second valve means associated with the second path, responsive to pressure difference between the second and second working chambers during piston rebounding stroke, for forming a controlled area of a second fluid flow gap, which area of the second fluid flow gap being variable depending upon the magnitude of pressure difference between the second and second working chambers;

a first piezoelectric element associated with the first valve means, for varying valve characteristics of the first valve, the first piezoelectric element being responsive to the pressure difference to produce a first pressure indicative signal having a first value which is variable depending upon the piston stroke direction;

a second piezoelectric element associated with the second valve means, for varying valve characteristics of the second valve, the second piezoelectric element being responsive to the pressure difference to produce a second pressure indicative signal having a second value which is variable depending upon the piston stroke direction; and a control means, responsive to the first and second pressure indicative signals for discriminating piston stroke direction on the basis thereof and generating first and second control signals to be supplied to the first and second piezoelectric elements for obtaining desired damping characteristics depending upon piston stroke directions.

The first piezoelectric element may be responsive to the pressure difference generated by the piston bounding stroke to produce a first level of the first pressure indicative signal and responsive to the pressure difference generated by the piston rebounding stroke to produce a second level of the first pressure indicative signal, which second level; and the second piezoelectric element is responsive to the pressure difference generated by the piston bounding stroke to produce a third level of second pressure indicative signal, which third level is lower than the first level, and responsive to the pressure difference generated by the piston rebounding stroke to produce a fourth level of the second pressure indicative signal, which fourth level is higher than the second level. At least one of the second level of the first pressure indicative signal and the third level of the second pressure indicative signal indicates zero level.

Preferably, the control means derives the first and second control signals so as to soften the damping characteristics during piston bounding stroke and to harden damping characteristics during piston rebounding stroke. The control means may derive the first and second control signals irrespectively of each other so that damping characteristics in piston bounding stroke and rebounding stroke can be controlled independently of each other.

According to another aspect of the invention, a variable damping characteristics shock absorber comprises:

a hollow cylinder defining therein an internal space;

a piston assembly disposed within the internal space of the cylinder for defining first and second working chambers;

a communication path means, incorporated in the piston assembly, for communicating the first and second working chambers, the communication means including a first path active during piston bounding stroke for establishing fluid communication between the first and second working chambers and a second path active during piston rebounding stroke for establishing fluid communication between the first and second working chambers;

a bottom valve assembly disposed between the second working chamber and a fluid reservoir chamber, the bottom valve means defining a third path for establishing fluid communication between the second chamber and the fluid reservoir chamber;

a first valve means associated with the third path, responsive to pressure difference between the first and second working chambers during piston bounding stroke, for forming a controlled area of a first fluid flow gap, which area of the first fluid flow gap being variable depending upon the magnitude of pressure difference between the first and second working chambers;

a second valve means associated with the second path, responsive to pressure difference between the second and second working chambers during piston rebounding stroke, for forming a controlled area of a second fluid flow gap, which area of the second fluid flow gap being variable depending upon the magnitude of pressure difference between the second and second working chambers;

a first piezoelectric element associated with the first valve means, for varying valve characteristics of the first valve, the first piezoelectric element being responsive to the pressure difference to produce a first pressure indicative signal having a first value which is variable depending upon the piston stroke direction;

a second piezoelectric element associated with the second valve means, for varying valve characteristics of the second valve, the second piezoelectric element being responsive to the pressure difference to produce a second pressure indicative signal having a second value which is variable depending upon the piston stroke direction; and a control means, responsive to the first and second pressure indicative signals for discriminating piston stroke direction on the basis thereof and generating first and second control signals to be supplied to the first and second piezoelectric elements for obtaining desired damping characteristics depending upon piston stroke directions, the specific embodiment, but are for explanation and understanding only.

Figure 7:
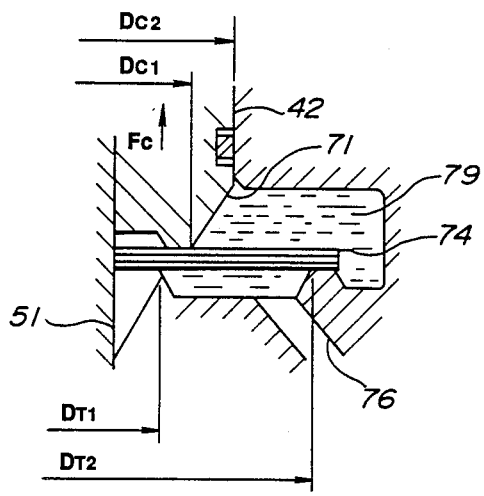
Figure 7:
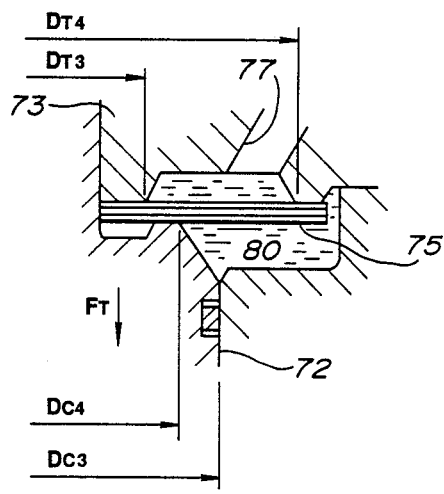
Figure 8:
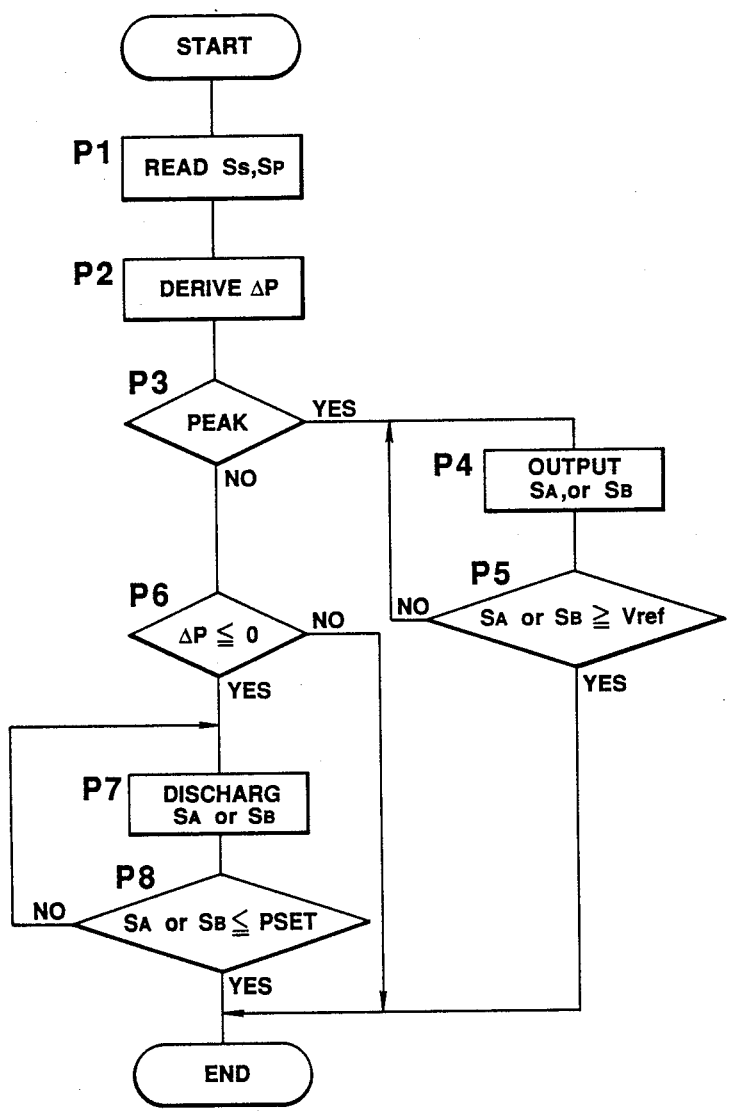
Figure 9:
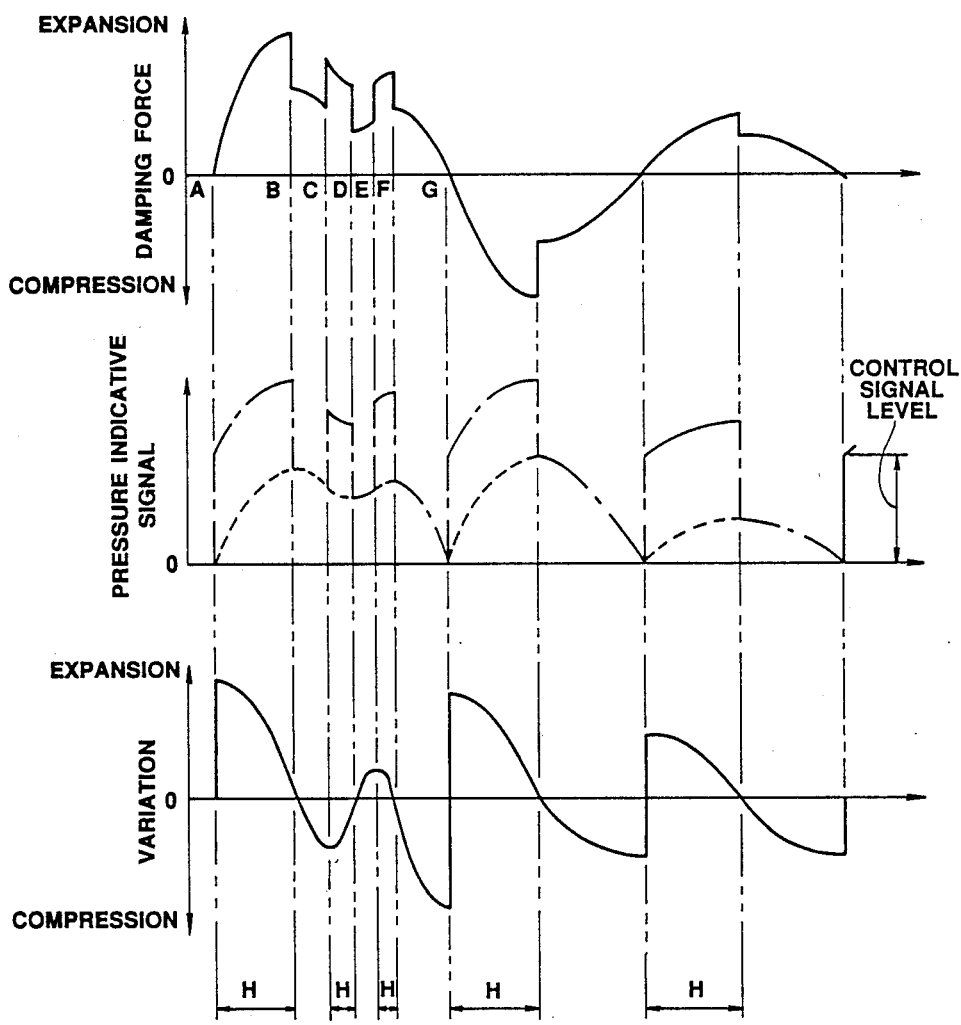
Figure 10:
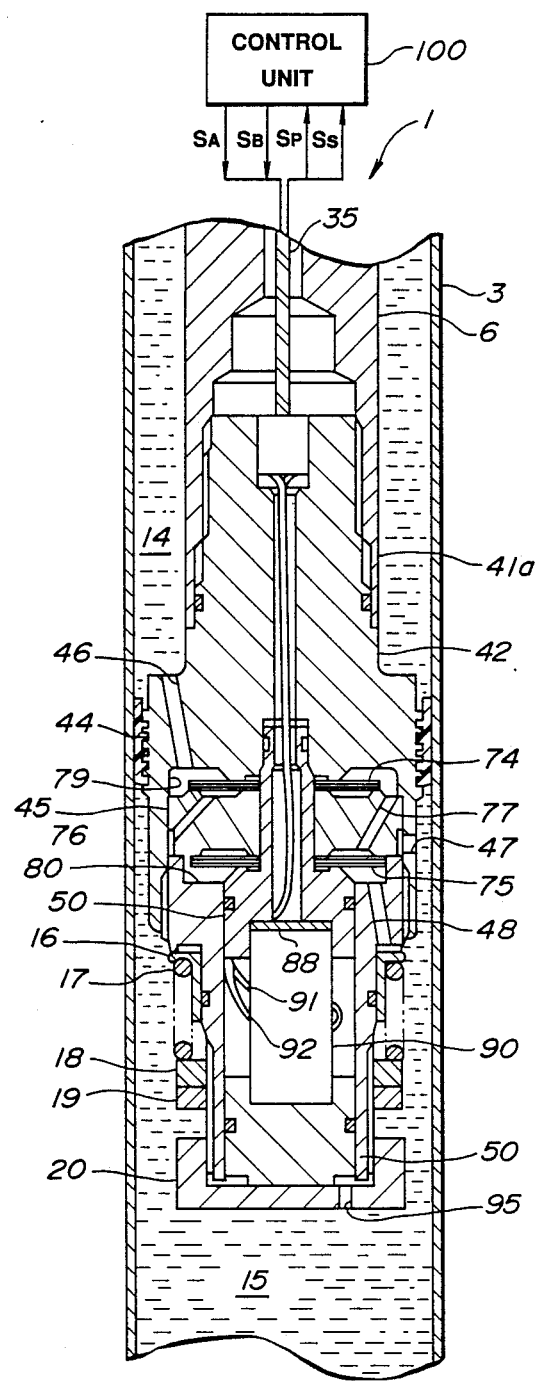
Figure 11:
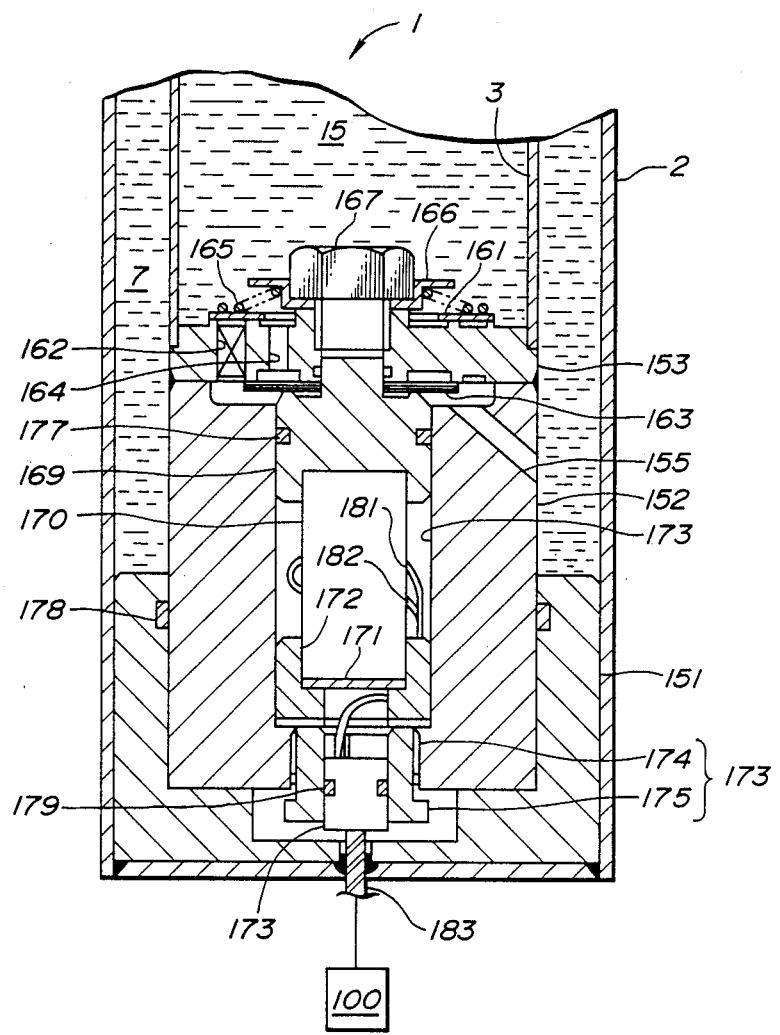

FIGS. 7(a) and 7(b) are enlarged section showing major part of a piston assembly employed in the preferred embodiment of the shock absorber of the invention;

FIG. 8 is a flowchart showing the preferred process of suspension control to be performed in the preferred embodiment of the suspension system;

FIG. 9 is timing chart showing control operations performed in the preferred embodiment of the suspension system;

FIG. 10 is a section of a modification of the preferred embodiment of the shock absorber according to the invention; and FIG. 11 is a section of a bottom fitting structure employed in the modification of the shock absorber of the invention.

DESCRIPTION OF THE PREFERRED EMBODIMENT

Figure 1:
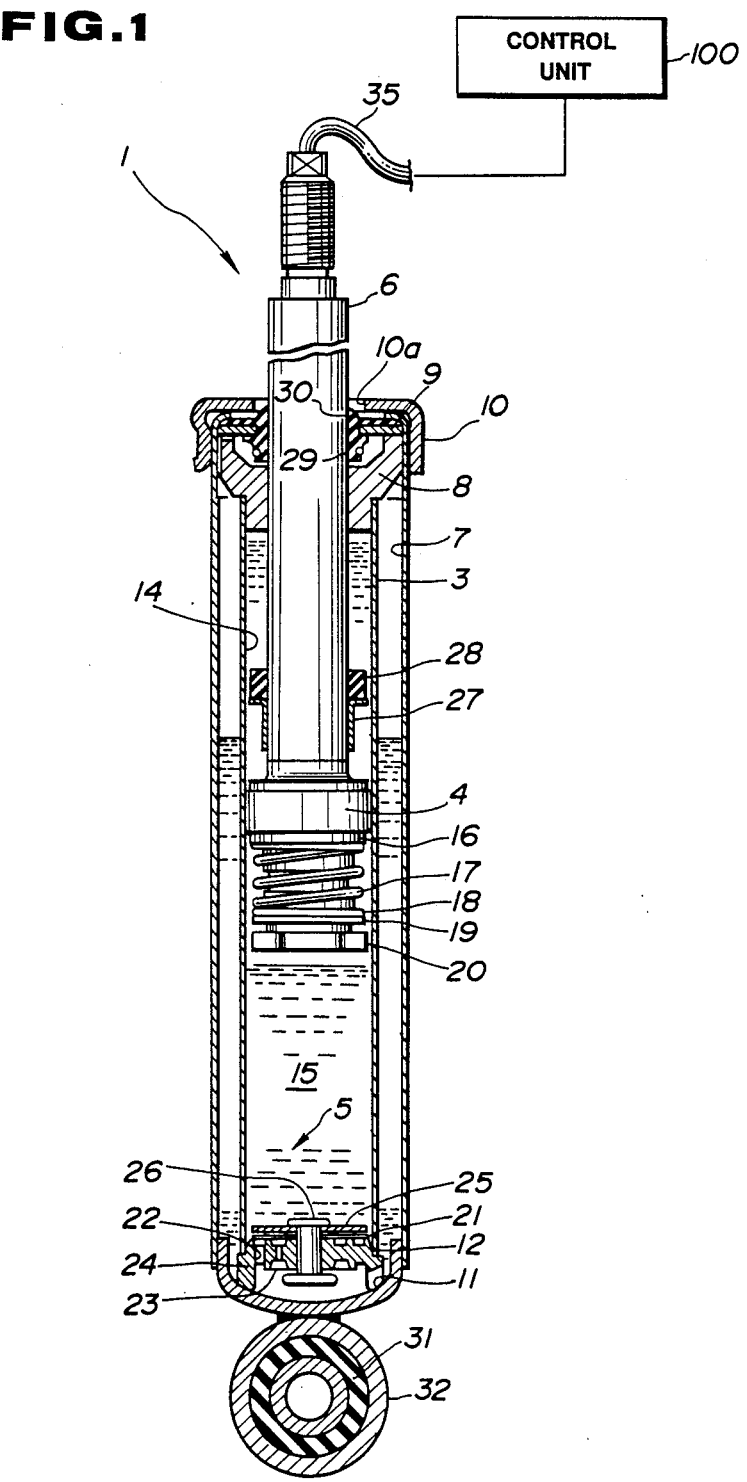
FIG. 1 is a section of preferred embodiment of a variable damping force shock absorber according to the present invention, which is associated with a control unit implementing a preferred process of suspension control.

Referring now to the drawings, particularly to FIG. 1, the preferred embodiment of a shock absorber, according to the present invention, serves as a principle component of the preferred embodiment of an automotive suspension system, according to the invention. The shown shock absorber 1 comprises a double action type shock absorber variable of damping characteristics. The shock absorber 1 has inner and outer cylinder tubes 3 and 2. The inner and outer cylinders 3 and 2 are arranged in coaxial arrangement for defining an annular chamber 7 which serves as a reservoir chamber.

A piston assembly 4 is disposed within the internal space of the inner cylinder tube 3 for dividing the internal space into upper and lower working chambers 14 and 15. The piston assembly 4 is supported on the lower end of a piston rod 6. The piston rod 6 is a guided by a rod guide 8 is engaged in the top end opening of the inner cylinder tube 3. The rod guide 8 cooperates with a piston seal 9 and a stopper plate 10 to form an upper plug assembly for sealingly closing the top ends of the inner and outer cylinder tubes 3 and 2.

The top end of the piston rod 6 is connected to a vehicle body (not shown) in per se known manner. On the other hand, a connecting eye 32 with an eye bushing 31 is provided on the lower end of the outer cylinder tube 2. The outer cylinder tube 2 is connected to a suspension member (not shown) rotatably supporting a road wheel. By this, the shock absorber 1 is disposed between the vehicle body and the suspension member to receive vibration energy causing relative displacement between the vehicle body and the suspension member. The shock absorber 1 is compressed in response to bounding stroke motion, in which the vehicle body and the suspension member are shifted to approach to each other, and expanded in response to a rebounding stroke motion, in which the vehicle body and suspension member are shifted away to each other. In response to the bounding stroke motion of the vehicle body and the suspension member, the piston assembly 4 strokes in compression stroke direction with compressing the lower working chamber 15. This causes increasing of working fluid pressure in the lower working chamber and decreasing of the working fluid pressure in the higher working chamber. On the other hand, in response to the rebounding stroke motion of the vehicle body and the suspension member, the piston assembly 4 strokes in expansion stroke direction with compressing the higher working chamber 14. Therefore, the fluid pressure in the upper working chamber 14 is increased and the fluid pressure in the lower working chamber 15 is decreased. The fluid reservoir chamber 7 is normally maintained at a pressure substantially corresponding to fluid pressure in the lower working chamber 15, stroke motion.

The lower end opening of the inner cylinder 3 is closed by a bottom valve assembly 12 which defines a communication path 11. The bottom valve assembly 12 thus establishes fluid communication between the fluid reservoir chamber 7 and the lower working chamber 15.

The piston assembly 4 accompanies an expansion valve 16 which is effective in a piston expansion stroke to produce a damping force. The expansion valve 16 is associated with a bias spring 17 which is active on the expansion valve 16 to constantly bias the latter in upward direction. The bias spring is mounted on the lower end of the piston rod 6 by means of an adjuster nut 18 and a lock nut 19. An adjuster nut 20 also engages with the lower end of the piston rod 6.

The bottom valve assembly 5 has a check valve 21 associated with a port 22 for openably closing the port. The check valve 21 is designed to open during piston expansion stroke to permit fluid flow from the reservoir chamber 7 to the lower working chamber 15. The bottom valve 5 is also provided with a compression valve 23 which is associated with the lower end of an orifice 24 to open in response to compression stroke in order to establish fluid communication from the lower working chamber 15 to the reservoir chamber 7. The check valve 21 and the compression valve 23 are mounted and secured on a bottom valve body 12 by means of a clamping pin 26. A stopper plate 25 is also mounted on the bottom valve body 12 in order to restrict magnitude of opening of the check valve 21. With the shown construction, the check valve 21 is responsive to the pressure difference between the lower working chamber 15 and the fluid reservoir chamber 7 to be shifted to the open position for introducing the working fluid in the fluid reservoir chamber into the lower working chamber. On the other hand, during piston compression stroke, pressure difference between the lower working chamber 15 and the fluid reservoir chamber 7 is created to shift the compression valve 23. By opening of the compression valve 23, a limited flow rate of the working fluid is permitted to flow from the lower working chamber 15 to the fluid reservoir chamber 7 with generating a damping force.

A rebounding stopper 28 which is made of an elastic material, such as a rubber, is mounted on the piston rod 6 by means of a retainer 27. The rebounding stopper 28 protects the piston assembly 4 from direct collision onto the lower end of the rod guide 8.

The stopper plate 10 is clamped onto the upper end of the outer cylinder tube 2. The stopper 10 defines a center opening 10a, through which the piston rod 6 extends. A rubber bushing (not shown) engages with the periphery of the center opening 10a of the stopper plate 10 for slidingly and sealingly guide the piston rod 6. A main lip 29 and a dust lip 30 are also provided in the upper plug assembly. The main lip 29 sealingly contact with the outer periphery of the piston rod for establishing a fluid tight seal. On the other hand, the dust lip 30 is provided in the vicinity of the stopper plate 10 and contacts with the outer periphery of the piston rod 4 to establish fluid tight seal so as to prevent the maddy water, dust and so forth.

The piston assembly 4 is designed to vary damping characteristics to generate damping force in response to vibration input according to variable characteristics in different damping mode. In order to control the damping mode of the piston assembly 4, a control unit 100 is connected to the piston assembly via a harness 35 which extends through the piston rod.

Figure 2:
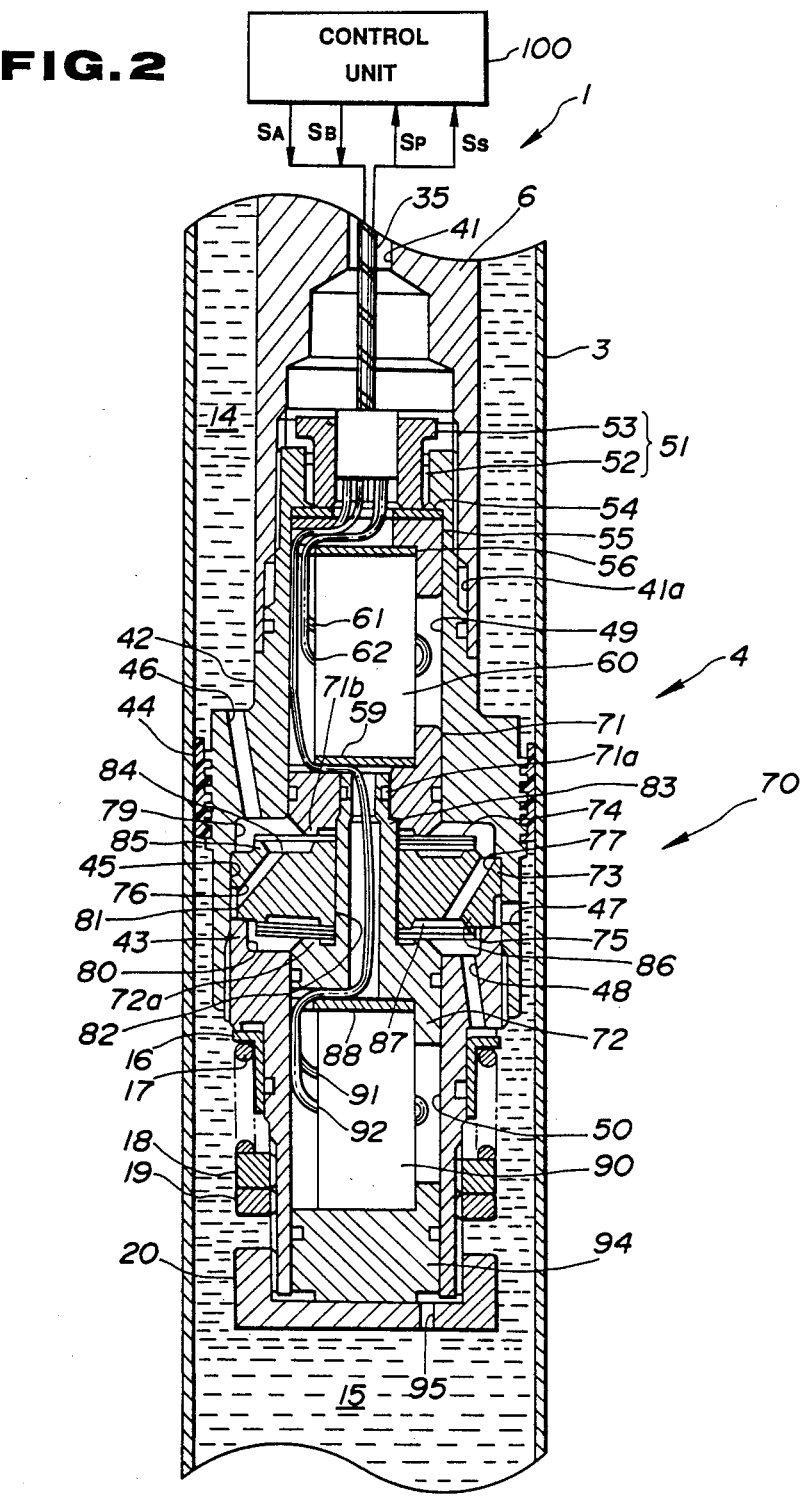
FIG. 2 is an enlarged section of the major part of the preferred embodiment of the variable damping force shock absorber, according to the invention.

FIG. 2 shows the detailed construction of the piston assembly 4 employed in the preferred embodiment of the shock absorber 1 of FIG. 1. As seen, the piston rod 6 defined an axially extending through opening 41 through which the wiring harness 35 extends. The lower end of the through opening 41 is communicated with a threaded groove 41a forming a piston receptacle. The piston assembly 4 includes a piston body 42 which has an upward extension which threadingly engages with the threaded groove 41a of the piston rod 6 so that the piston body 42 is firmly mounted on the lower end of the piston rod 6. The piston body 42 has an outer periphery mating with the inner periphery of the inner cylinder 3. A low friction seal member 44 which is made of a low friction material, such as a teflon, engages on the outer periphery of the piston body 42 for establishing the fluid tight seal between the inner periphery of the inner cylinder 3. The piston body 42 has a threaded lower end, to which the upper end of a sleeve 43 engages. The aforementioned adjusting nut 18, the lock nut 19 and the adjusting nut 20 are engaged onto the outer periphery of the lower end portion of the sleeve 43.

The piston body 42 defines an internal space 45 which is in communication with the upper and lower working chambers via communication path 46 and 47 defined therethrough. On the other hand, the sleeve 43 defines a through opening 48 for communication between the internal space 45 and the lower working chamber 15. The expansion valve 16 is associated with the end of the through opening 48 opening to the lower working chamber 15 so as to restrict fluid flow path area for generating damping force. The expansion valve 16 is responsive to a fluid pressure overcoming the spring force of the bias spring 17 to widen the path area for pressure relieving function.

The assembly of the piston body 42 and the sleeve 43 defines first and second chambers 49 and 50 of essentially circular cross section. These first and second chambers 49 and 50 have smaller diameter than the space 45 and communicated with the later. A first piezoelectric element 60 is disposed within the first chamber 49. The first piezoelectric element 60 has an upper section associated with an adjusting mechanism 51. The adjusting mechanism 51 comprises an adjuster screw 53 engaging with a female thread 52 formed on the inner periphery of the top end of the piston body 42. The adjuster nut 53 has a lower end coupled with an upper end plate 56 fixed onto the upper end of the piezoelectric element 60 via a contact plate 54 and a cap 55. The adjuster screw 53 is manually rotatable for axial shifting to cause axial displacement of the piezoelectric element 60. The piezoelectric element 60 is associated with a slider member 71 via a lower end plate 59.

Similarly, a second piezoelectric element 90 is disposed within the second chamber 50. The second piezoelectric element 90 is supported within the second chamber by means of a cap 94 and the adjuster nut 20, so that the axial position thereof can be adjusted by means of the adjusting nut. The upper end of the second piezoelectric element 90 is associated with a valve core 72 via an upper end plate 88.

The slider 71 and the valve bore 72 are associated with a valve body 73 to form a damping mode control mechanism 70. As seen, the valve body 73 is disposed within the space 45 to define therein upper and lower annular chambers 79 and 80. The valve body 73 further defines an annular chamber 81 defined between the outer periphery of the valve body 73 and the inner periphery of the piston body 42. The upper annular chamber 79 is in communication with the upper working chamber 14 via a communication path 48. On the other hand, the lower annular chamber 80 is in communication with the flow working chamber 15 via the through opening 48. The annular chamber 81 is in communication with the lower working chamber 15 with the fluid path 47. The valve body 73 defines a center opening 82 through which an upper cylindrical section 83 of the valve core 72 extends, and communication orifices 76 and 77 The communication orifice 76 opens to an annular groove 84 formed on the upper surface of the valve body and surrounded by an annular land 85. The annular groove 84 is exposed to the upper annular chamber 79. The communication orifice 76 also opens to the annular chamber 81. On the other hand, the communication orifice 77 opens to an annular groove 87 formed on the lower surface of the valve body 72 and surrounded by an annular land 86. The annular groove 86 is exposed to the lower annular chamber 80. The communication orifice 77 also opens to the upper annular chamber 79.

Upper and lower valve members 74 and 75 are provided for openably closing the annular grooves 84 and 87 and whereby blocking fluid communication between the annular grooves and the associated annular chambers 79 and 80. The valve members 74 and 75 comprises leaf springs resiliently deformable in response to the pressure exerted thereto. Normally, the valve members 74 and 75 are supported at the center boss sections projecting at the center portion of valve body. At this position, the lever length of the valve members 74 and 75 is relatively large to have an initial stiffness to cause resilient deformation in response to the fluid pressure exerted thereto. On the other hand, when the annular projections 71b and 72a of the slider 71 and the valve core 72 are active on the valve member 74 and 75 when the slider and valve cores are operated by the effect of the piezoelectric elements 60 and 90, the lever lengths of the valve members are reduced to increase stiffness for generating greater damping force in response to vibration input. In the following discussion, the damping mode where the valve member 74 and 75 operates in smaller stiffness, in which the annular projections 71b and 72 of the slider and valve core are not active, will be referred to as SOFT mode . On the other hand, the damping mode where the annular projections are active to increase stiffness, will be hereafter referred to as HARD mode.

It should be noted that the valve members 74 and 75 can comprise a plurality of thin disc shaped relief springs for resilient deformation in response to the fluid pressure exerted thereonto.

As seen from FIG. 2, the first and second piezoelectric elements 60 and 90 are connected to the control unit 100 via cables 61, 62, 91 and 92 which forms the wiring harness. As can be clearly seen from FIG. 4, the cables 61 and 91 connect respectively associated piezoelectric elements 60 and 90 to the ground. On the other hand, the cables 62 and 92 connect the piezoelectric elements 60 and 90. Each of the piezoelectric elements 60 and 90 comprises a plurality of thin disc shaped piezoelectric plates piled up in series. Each of the piezoelectric plates respectively having a pair of electrodes. As is well known, when a voltage is applied to such piezoelectric plates to cause electrodistortion to expand and contact the axial length. The magnitude of electrodistortion is variable depending upon the magnitude of voltage applied to the piezoelectric plates. Such electrodistortion may cause mechanical distortion of the piezoelectric element to cause variation of the axial length.

On the other hand, when the fluid pressure is applied to the piezoelectric elements 60 and 90, each of the piezoelectric plate as the components of the piezoelectric elements is caused mechanical distortion for producing an electric power. The magnitude of the electric power to be generated by the piezoelectric elements 60 and 90 is variable depending upon the magnitude of the mechanical distortion and whereby corresponding to the magnitude of the pressure exerted on the piezoelectric elements. In the practical construction, the first piezoelectric element 60 is subject a fluid pressure of the annular chamber 81 exerted on the valve member 74 which corresponds to the fluid pressure in the lower working chamber 15, via the slider. The first piezoelectric element 60 is thus produces a compression mode pressure indicative signal Sp. On the other hand, the second piezoelectric element 90 is subject fluid pressure in the upper annular chamber 79 exerted on the valve member via the valve member 75 and the valve core 72, which fluid pressure corresponds to that in the upper fluid chamber 14. The second piezoelectric element 90 thus produces a pressure indicative signal Ss. As will be appreciated, the magnitude of the compression mode pressure indicative signal Sp and the pressure indicative signal Ss are variable depending upon the magnitude of pressure in the upper and lower working chambers 14 and 15. In addition, in the piston compression stroke, the fluid pressure in the lower working chamber 15 is also exerted on the second piezoelectric element 90 via the adjuster nut 20 and a cap 94. Therefore, even in the piston expansion stroke, the second piezoelectric element 90 outputs the pressure indicative signal Ss. Therefore, in the piston expansion stroke, only pressure indicative signal Ss is output from the piezoelectric element 90. On the other hand, in the piston compression stroke, both of the compression mode and pressure indicative signals $S_p$ and $S_s$ are output from the first and second piezoelectric elements 60 and 90.

The piezoelectric elements 60 and 90 feed the compression mode pressure indicative signal Sp and the pressure indicative signal Ss to the control unit 100. The control unit 100 processes these compression mode and pressure indicative signals Sp and Ss to produce an expansion mode control signal $S_A$ and a compression mode control signal $S_B$. The expansion mode control signal $S_A$ is fed to the first piezoelectric element 60 for controlling axial length thereof to adjust the position of the valve core 72 and whereby adjust the stiffness of the valve members 74 and 75. By adjusting the stiffness of the valve member 75, the damping characteristics in response to the piston expansion stroke can be switched between HARD mode and SOFT mode. Similarly, the compression mode control signal $S_B$ is applied to the second piezoelectric element 90 for controlling the axial length thereof to adjust the position of the slider 71 relative to the valve members 74 and 75 and whereby adjusts the stiffness of the associated valve member in order to switch the damping mode between HARD mode and SOFT mode. By this, the damping characteristics in the piston compression stroke can be adjusted.

Figure 3:
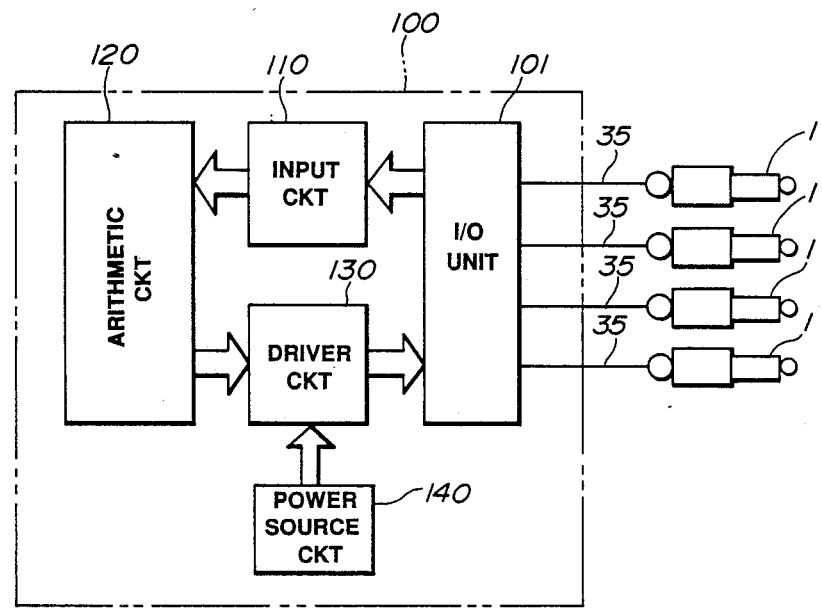
FIG. 3 is a block diagram of the control unit employed in the preferred embodiment of an automotive suspension system and designed for implementing the preferred suspension control process.
Figure 4:
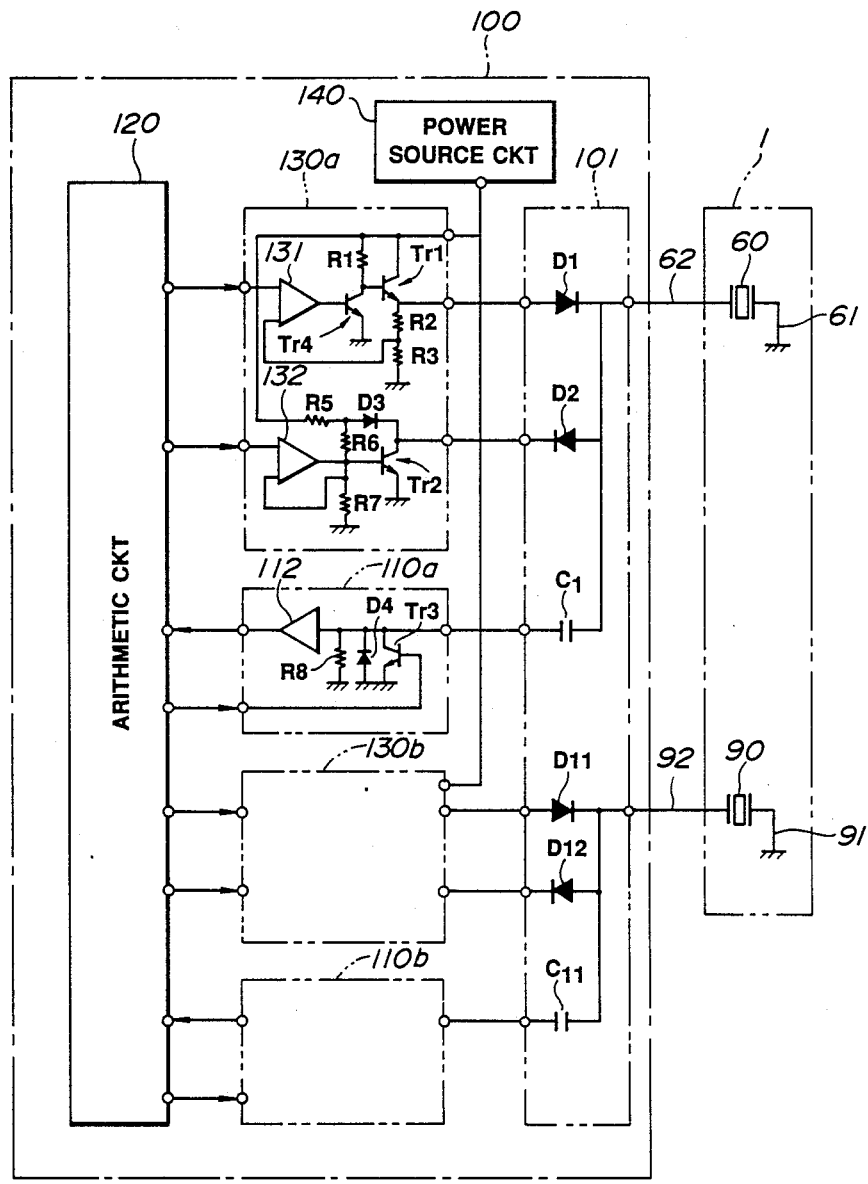
FIG. 4 is a detailed block diagram of the control unit of FIG. 3.
Figure 6:
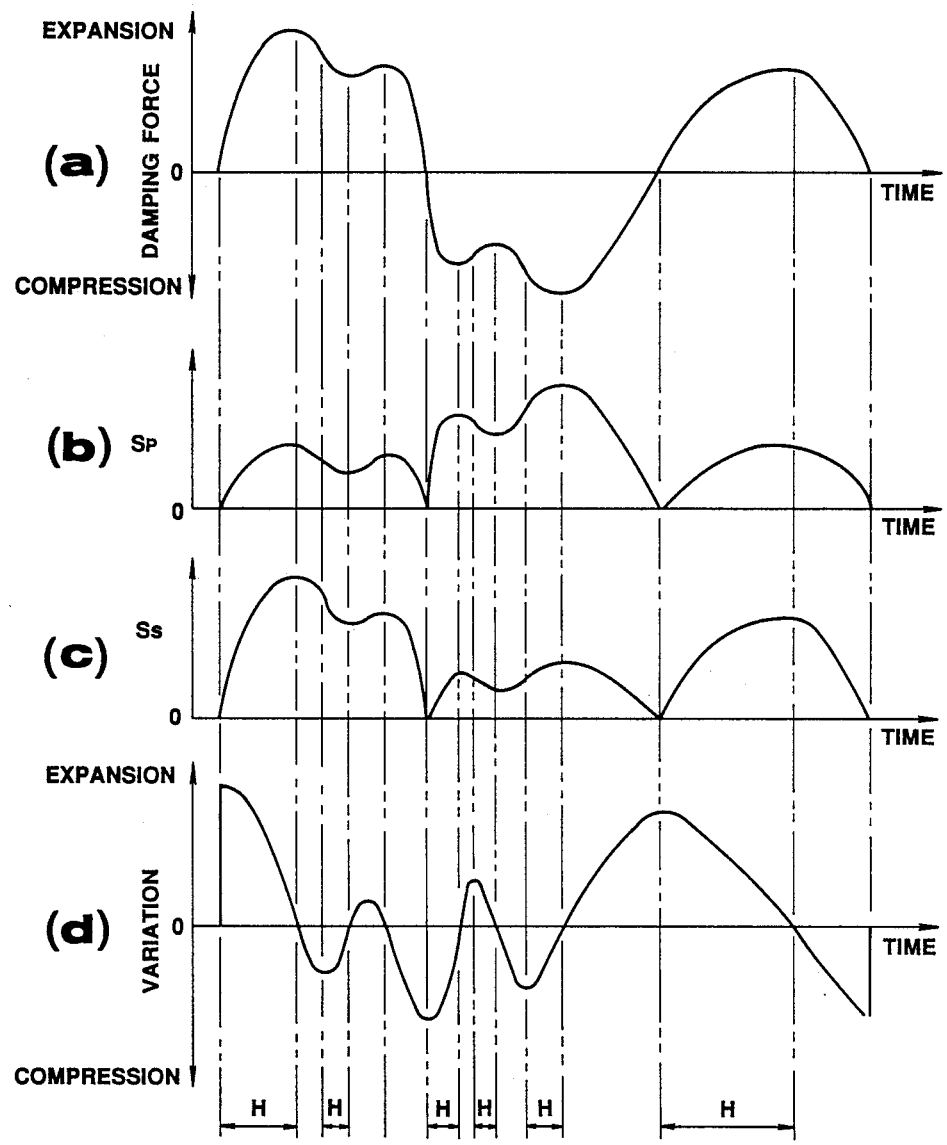
FIG. 6 is a timing chart showing variation of suspension mode in relation to variation of damping force to be generated in the shock absorber.

As shown in FIG. 3, the control unit 100 comprises a microprocessor based circuit including an input/output (I/O) port 101, an input circuit 110, an arithmetic circuit 120, a driver circuit 130 and a driver power source circuit 140. The I/O unit 101 is connected to respective damping control mechanisms 70 of the shock absorbers 1 disposed in front-left, front-right, rear-left and rear-right suspension systems via the cables 62 and 92 of the wiring harnesses 35. The compression mode pressure indicative signals Sp and the pressure indicative signals Ss generated by the piezoelectric elements 60 and 90 of respective shock absorbers 1 are input to the control unit 100 through the I/O port 101. The I/O unit 101 has a plurality of control channels respectively adapted to control the piezoelectric elements 60 and 90 in respective shock absorbers 1 of front-left, front-right, rear-left and rear-right suspension systems, though FIG. 4 shows only one shock absorber 1. Each control channel has first and second I/O sections 101a and 101b for receiving pressure indicative signals Sp and Ss and outputting the control signals $S_A$ and $S_B$. The first control section 101a has a capacitor $C_1$ for receiving the compression mode pressure indicative signal Sp and serving as a filter for removing noise direct current component in input signal. The first control section 101a also has a pair of diodes $D_1$ and $D_2$ arranged at opposite polarities.

Similarly, the second control section 101b has a capacitor $C_{11}$ for receiving the compression mode pressure indicative signal Ss and serving as a filter for removing noise direct current component in input signal. The second control section 101b also has a pair of diodes $D_{11}$ and $D_{12}$ arranged at opposite polarities.

The capacitors $C_1$ and $C_{11}$ are connected to first and second sections 110a and 110b of the input circuit 110 respectively. The first section 130a includes a switching transistor $Tr_3$ and an amplifier 112. The switching transistor $Tr_3$ has a base electrode connected to one output terminal of the arithmetic circuit to receive therefrom a selector command. The transistor $Tr_3$ has a collector electrode connected to a junction between the capacitor $C_1$ of the I/O unit 101 and the amplifier 112. The emitor electrode of the switching transistor $Tr_3$ is grounded. In addition, the first section 110a includes a diode $D_4$ and a resistor $R_8$. With the shown construction, the selector command is normally held OFF to input LOW level command to the base electrode of the switching transistor $Tr_3$. Therefore, the switching transistor $Tr_3$ is normally held OFF to break connection between the junction and the ground. At this position, the compression mode pressure indicative signal Sp is fed to the amplifier 112 and subsequently to the arithmetic circuit 120. On the other hand, the switching transistor $Tr_3$ is responsive to the HIGH level selector command to turn ON to establish grounding circuit for grounding the junction between the capacitor $C_1$ and the amplifier 112. As a result, the compression mode pressure indicative signal Sp from the first piezoelectric element 60 is grounded. Therefore, the input to arithmetic circuit 120 from the amplifier 112 becomes substantially zero.

Figure 5:
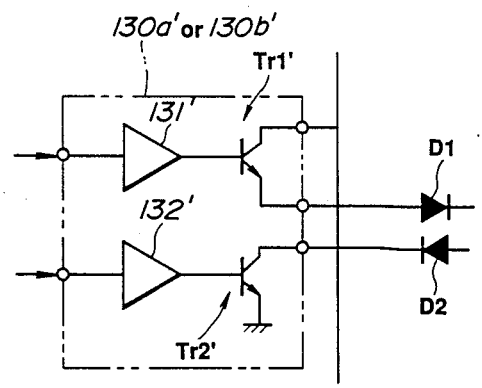
FIG. 5 is circuit diagram of the simplified modification of an output circuit in the control unit.

It should be should be appreciate, though FIG. 5 shows simple block 110b to show the second section of the input circuit, the circuit construction and function of the second section are identical to that discussed with respect to the first section.

The driver circuit 130 also includes first and second sections 130a and 130b. The first section 130a of the driver circuit 130 has a control section 130c and a switching section 30d. Both of the control section 130c and the switching section 130d are connected to the arithmetic circuit 120 for receiving the expansion mode control signal $S_A$. The control section 130c has an operational amplifier 131 high compares the expansion mode control signal level $S_A$ with a feedback signal level fed back from the output end via a voltage divider constituted by resistors $R_2$ and $R_3$. As long as the expansion mode control signal level is higher than the feedback signal level, the output level of the operational amplifier 131 outputs LOW level signal to maintain the input level of a gate electrode of a transistor $Tr_4$ at LOW level. Therefore, the bias at the collector electrode of the transistor $Tr_4$ becomes HIGH to turn a transistor $Tr_1$ ON. By turning ON of the transistor $Tr_1$, the driver voltage is fed to the piezoelectric element 60 to expand the axial length of the latter to switch the damping mode of the damping mode control mechanism 70 from SOFT mode to HARD mode.

On the other hand, the switching section 130d also has an operational amplifier 132. The operational amplifier 132 receives the expansion mode control signal $S_A$ and compares the expansion mode control signal level with a reference level which is input from the driver power source circuit via a resistor $R_5$ and a voltage divider constituted by resistors $R_6$ and $R_7$. With this circuit connection, the output of the operational amplifier 132 is maintained at LOW level to maintain a switching transistor $Tr_2$ at non-conductive state for blocking communication between the diode $D_2$ and the ground while the input level from the arithmetic circuit 120 stays lower than a reference level input from the voltage divider of the resistors $R_6$ and $R_7$. It should be noted that the reference level is determined by the resistances of the resistances of the resistors $R_6$ and $R_7$, which reference level is set at a level corresponding to a predetermined initial stress level to exert on the first piezoelectric element 60. On the other hand, when the expansion mode control signal level $S_A$ from the arithmetic circuit is higher than or equal to the reference level, the output level of the operational amplifier 132 turns into HIGH level to turn the transistor $Tr_2$ ON. As a result, the diode $D_2$ is connected to the ground via the transistor $Tr_2$. Therefore, the voltage signal as the driver voltage on the cable 62 is grounded so that the expansion mode control signal voltage $S_A$ applied to the first piezoelectric element 60 can be discharged. The Transistor $Tr_2$ is maintained in conductive state until the potential at the first piezoelectric element 60 drops to the initial level, at which the input level from the arithmetic circuit is lowered across the reference level.

It should be noted while the shown construction employs a specific circuit construction to implement the desired mode switching operation for switching operational mode of the first piezoelectric element 60 between a sensor mode for monitoring the fluid pressure in the lower working fluid chamber 15 and an actuator mode for controlling damping mode, it is possible to employ different construction of circuit. For example, as shown in FIG. 5, each of the output circuits 130a and 130b can comprise a pair of buffer amplifier 131' and 132' and transistors $Tr_1'$ and $Tr_2'$. In such case, the arithmetic circuit 120 selectively feeds the expansion mode control signal $S_A$ for the buffer amplifiers 131' and 132'. Namely, while the harder damping characteristics is to be ordered, the arithmetic circuit 120 feeds the expansion mode control signal $S_A$ to the buffer amplifier 131' to turn the transistor $Tr_1'$ conductive to apply controlled voltage of the expansion mode control signal. On the other hand, in order to lower damping characteristics, the expansion mode control signal is fed to the buffer amplifier 132' to make the transistor $Tr_2'$ ON to complete grounding circuit for discharging the control signal voltage applied to the first piezoelectric element 60.

As will be seen herefrom, the piezoelectric element 60 acting for monitoring the fluid pressure level in the lower working chamber 15, the capacitor $C_1$ of the first section 101a of the I/O unit 101, the first section 110a of the arithmetic circuit 120, the second section 130b of the output circuit and pair of diodes $D_{11}$ and $D_{12}$ of the second section 101b of the I/O unit 101, and the piezoelectric element 90 acting for adjusting the damping mode of the damping mode control mechanism 70 form a compression mode control channel. On the other hand, the second piezoelectric element 90 acting for monitoring the fluid pressure level in the upper working chamber 14, the capacitor $C_{11}$ of the second section 101b of the I/O unit 101, the second section 110b, the arithmetic circuit 120, the second section 130a of the output circuit and pair of diodes $D_1$ and $D_1$ of the first section 101a of the I/O unit 101, and the piezoelectric element 60 acting for adjusting the damping mode of the damping mode control mechanism 70 form an expansion mode control channel.

In order to initially set the piezoelectric elements 60 and 90, adjustment is performed by means of the adjuster nuts 53 and 20. Namely, a predetermined voltage is applied for respective piezoelectric elements 60 and 90. At this position, the adjusted nuts 53 and 20 are rotated to adjust stress to be exerted on the piezoelectric elements 60 and 90. This adjustment is continued until the outlet levels of the piezoelectric elements 60 and 90 become a predetermined level.

The operation to be performed in the preferred embodiment of the suspension system will be discussed herebelow with reference to FIGS. 6 to 9.

As shown in FIG. 6(c), the fluid pressure in the upper working chamber 14 is monitored by the first and second piezoelectric elements 60 and 90 during the piston expansion stroke. The piezoelectric element 60 and 90 thus produce the the pressure indicative signals Sp and Ss. Then, the arithmetic circuit 120 performs arithmetic operation to derive variation rate of the pressure indicative signals Sp and Ss. The variation rate of the pressure indicative signals Ss and Sp is shown in FIG. 6(c). When the variation rate reaches a predetermined value, the expansion mode control signal ordering harder damping characteristics is output to switch the damping mode from SOFT mode to HARD mode, as shown in periods labeled H in FIG. 6(d). The damping mode is switched back to SOFT mode from the HARD mode when the variation rate decreases across a zero.

On the other hand, during the piston compression stroke, the fluid pressure in the lower working chamber 15 is monitored by both of the first and second piezoelectric elements 60 and 90. The first piezoelectric element 60 then produces the compression mode pressure indicative signal Sp. At the same time, the second piezoelectric element 90 produces the pressure indicative signal Ss. Therefore, judgement is then made that the piston is in the compression stroke by the arithmetic circuit 120. Therefore, the arithmetic circuit 120 calculates variation rate of the compression mode pressure indicative Sp. When the variation rate derived on the basis of the compression mode pressure indicative signal Sp reaches the predetermined value, the compression mode control signal $S_B$ is output to the second piezoelectric element 90 to switching damping mode from the SOFT mode to HARD mode. Similarly to the expansion mode, the damping mode will be switched back to the SOFT mode when the variation rate decreases across zero.

Further detail will be discussed with reference to FIGS. 7(a) and 7(b), in which are illustrated dimensional relationship of principle components in the piston assembly 4. Assuming the piston is in rebounding stroke with compressing the higher working chamber 14, high fluid pressure P is generated in the higher working chamber. The increased fluid pressure in the higher working chamber 14 flows through the communication path 46 into the upper annular chamber 79. The fluid pressure P then urges the lower valve member 75 via the communication orifice 77 and the annular groove 87, in order to form a gap for fluid flow therethrough. Magnitude of flow path of the gap is variable depending upon the magnitude of fluid pressure exerted on the lower valve member 75. Depending upon the magnitude of the flow path area of the gap, flow restriction is determined for generating a damping force. Here, assuming that the effective area of the lower valve member 75 is ATT, a depression force $F_T$ is generated in response to the fluid pressure P. The depression force $F_T$ thus generated is transmitted to the piezoelectric element 90 via the valve core 72. Therefore, the piezoelectric element 90 produce an output voltage $V_T$ corresponding to the exerted depression force $F_T$. At the same time, the fluid pressure P in the annular chamber 79 is exerted on the slider 71. Therefore, a depression force $F_c$ which is variable depending upon the fluid pressure P and the effective area ACC of the slider 71 is generated. The depression force $F_c$ is transmitted to the piezoelectric element 60. Therefore, the piezoelectric element 60 generates an output voltage Vc corresponding to the exerted depression force $F_c$.

The effective area ACC of the slider 71 and the effective area ATT of the lower valve member 75 are respectively illustrated as follows:

$$ACC = \pi/4(Dc_2{}^2 - Dc_1{}^2)$$

$$ATT = \pi/4(DT_4{}^2 - DT_3{}^2)$$

where
 $Dc_2$ is an external diameter of the slider 71;
 $Dc_1$ is an internal diameter of the effective area portion of the slider 71;
 $DT_4$ is an external diameter of the lower valve member 75; and
 $DT_3$ is an internal diameter of the effective area of the lower valve member 75.

On the other hand, the depression forces $F_c$ and $F_T$ respectively generated at the slider 71 and the lower valve member 75 can be illustrated by:

$$F_c = P \times ACC$$

$$F_T = P \times ATT \qquad (1)$$

As can be seen from FIGS. 7(a) and 7(b), the effective area ATT of the lower valve member 75 is set greater than the effective area ACC of the slider 71. Therefore, the depression force $F_T$ becomes greater than the depression force $F_c$, as shown in FIG. 6(c).

Assuming the piston is in bounding stroke with compressing the lower working chamber 15, high fluid pressure P is generated in the lower working chamber. The increased fluid pressure in the lower working chamber 15 flows through the communication path 48 into the lower annular chamber 80. The fluid pressure P then urges the upper valve member 74 via the communication orifice 81 and the annular groove 84, in order to form a gap for fluid flow therethrough. Magnitude of flow path of the gap is variable depending upon the magnitude of fluid pressure exerted on the upper valve member 74. Depending upon the magnitude of the flow path area of the gap, flow restriction is determined for generating a damping force. Here, assuming that the effective area of the upper valve member 74 is ACT, a depression force $F_c$ is generated in response to the fluid pressure P. The depression force $F_c$ thus generated is transmitted to the piezoelectric element 60 via the slider 71. Therefore, the piezoelectric element 60 produce an output voltage $V_c$ corresponding to the exerted depression force $F_c$. At the same time, the fluid pressure P in the annular chamber 80 is exerted on the valve core 72. Therefore, a depression force $F_T$ which is variable depending upon the fluid pressure P and the effective area ATC of the valve core is generated. The depression force $F_T$ is transmitted to the piezoelectric element 90. Therefore, the piezoelectric element 90 generates an output voltage VT corresponding to the exerted depression force $F_T$.

The effective area ATC of the valve core 72 and the effective area ACT of the upper valve member 74 are respectively illustrated as follows:

$$ACT = \pi/4(DT_2{}^2 - DT_1{}^2)$$

$$ATC = \pi/4(Dc_4{}^2 - DT_3{}^2)$$

where
 $Dc_4$ is an external diameter of the valve core 72;
 $Dc_3$ is an internal diameter of the effective area portion of the valve core 72;
 $DT_2$ is an external diameter of the upper valve member 74; and
 $DT_1$ is an internal diameter of the effective area of the upper valve member 74.

On the other hand, the depression forces $F_T$ and $F_c$ respectively generated at the valve core 72 and the upper valve member 74 can be illustrated by:

$$F_T = P \times ATC$$

$$F_c = P \times ACT \qquad (1)$$

As can be seen from FIGS. 7(a) and 7(b), the effective area ACT of the upper valve member 74 is set greater than the effective area ATC of the valve core 72. Therefore, the depression force $F_c$ becomes greater than the depression force $F_T$, as shown in FIG. 6(c).

As will be appreciated, the output voltages $V_T$ and $v_c$ serves as the pressure indicative signals Sp and Ss. Since the level of these pressure indicative signals varies depending upon the piston stroke directions, discrimination of the piston stroke direction can be made by comparing the pressure indicative signal levels.

FIG. 8 shows a flowchart showing operation performed in the arithmetic circuit. Immediately after starting execution, the pressure indicative signal Ss and the compression mode pressure indicative signal Sp are read out at a step P1. Then, discrimination is made for the piston stroke direction on the basis of the read pressure indicative signal Ss and compression mode pressure indicative signal Sp. As set forth, the piston expansion stroke is detected when the read compression mode pressure indicative signal Sp is held zero. On the other hand, when the compression mode pressure indicative signal Sp is greater than zero, the piston compression stroke is detected. The arithmetic circuit 120 thus selects one of the pressure indicative signal Ss and the compression mode pressure indicative signal. Then, at a step P2, variation rate $\Delta P$ is derived on the basis of the selected one of the pressure indicative signal Ss and the compression mode pressure indicative signal Sp. Practically, the variation rate $\Delta P$ is calculated by differentiating the selected one of the pressure indicative signals Ss and Sp.

Here, the variation rate $\Delta P$ of the pressure to be exerted on the first and second piezoelectric elements 60 and 90 becomes maximum at the initial space of the piston expansion and compression stroke and becomes minimum (zero) at the peak of vibration. On the other hand, the piston stroke speed becomes higher according to increasing the piston stroke and according to shortening of vibration cycle period. Therefore, by monitoring the variation rate $\Delta P$, magnitude of input vibration can be detected for quicker response. This may provide higher response characteristics to the input vibration in controlling the suspension mode.

It should be appreciated, it is possible to provide a step between the steps P1 and P2 to check the frequency range of the pressure indicative signals for performing suspension control on the basis of the input pressure indicative signal within a predetermined frequency range.

At a step P3, the peak of the variation rate $\Delta P$ is detected. When the peak of the variation rate $\Delta P$ is detected as checked at the step P3, one of the expansion mode control signal $S_A$ or the compression mode control signal $S_B$ is output to the corresponding one of the first and second piezoelectric elements 60 and 90 depending upon the discriminated piston stroke direction. Then, at a step P5, the voltage level of the expansion mode control signal $S_A$ or the compression mode control signal $S_B$ output at the step P4, is checked whether the voltage level is higher than or equal to a voltage threshold level $V_{ref}$. The voltage threshold level $V_{ref}$ is set at a minimum voltage for causing distortion in the corresponding one of the first and second piezoelectric element 60 or 90 in order to switch damping mode from the SOFT mode to the HARD mode. Unless, the control signal voltage level as checked at the step P5 becomes higher than or equal to the voltage threshold level $V_{ref}$, process returns to the step P4. The steps P4 and P5 are repeated until the control signal voltage level becomes higher than or equal to the minimum voltage level for driving the associated one of the first and second piezoelectric element 60 and 90. When the control signal voltage level becomes higher than or equal to the voltage threshold level $V_{ref}$ as checked at the step P5, then process goes END.

Though the shown embodiment switches the damping mode between two stages, i.e. HARD mode and SOFT mode, it is possible to vary the damping characteristics in either in or both in the HARD and SOFT mode according to the vibration magnitude. Namely, since the distortion magnitude may essentially linearly proportional to the voltage applied thereto, linear or stepless variation of the damping characteristics can be obtained by linearly or steplessly varying the voltage of the control signal. Practically, it may be possible to vary the control signal voltage according to variation of the variation rate $\Delta P$. Furthermore, it may also be possible to determine the control signal voltage corresponding to the peak level of the variation rate $\Delta P$.

On the other hand, the peak of the variation rate $\Delta P$ is not detected as checked at the step P3, check is performed whether it indicates the variation rate is zero, at a step P6. If the variation rate $\Delta P$ is greater than zero as checked at the step P6, process directly goes to END.

On the other hand, when the variation rate $\Delta P$ is zero as checked at the step P6, the switching transistor $Tr_2$ in the corresponding one of the first and second sections 130a and 130b is turned ON to discharge the voltage applied to the piezoelectric element 60 and 90, at a step P7. Then, at a step P8, one of the pressure indicative signal Ss and the compression mode pressure indicative signal Sp, which is selected at the step P1, is again checked against a set value $P_{set}$. As long as the checked pressure indicative signal is greater than the set value $P_{set}$ as checked at the step P8, the steps P7 and P8 are repeated to discharge the voltage applied corresponding one of the piezoelectric element 60 or 90 at a level lower than or equal to the set value $P_{set}$.

FIG. 9 shows timing chart showing example of operation practically performed in the preferred embodiment of the suspension system according to the present invention. In the shown example, it is assumed that the variation rate $\Delta P$ of the pressure indicative signal Ss and the compression mode pressure indicative signal Sp varies as shown in FIG. 8(c). At a point A, the variation rate $\Delta P$ rapidly increased to be greater than or equal to the predetermined value $P_{ref}$. Then, the damping mode is switched from SOFT mode to HARD mode as shown in the period between the point A and a point B. During this period, the pressure indicative signal Ss or Sp is shifted in a magnitude corresponding to the voltage level of the driver signal exerted on the corresponding piezoelectric element, as shown by one-dotted line in FIG. 8(b). As can be seen from FIG. 8(b), the pressure indicative signal thus varies according to variation of the fluid pressure in the corresponding one of the upper and lower working chamber as shown by broken line in FIG. 8(b). At the point B, the vibration reaches the peak thus the variation rate $\Delta P$ becomes zero. In response to this, the damping mode is switched from HARD mode to SOFT mode.

As seen from FIG. 8(a), assuming that the vibration is caused in rebounding direction to cause expansion stroke of the piston, the damping force created against the piston expansion stroke is increased by setting the damping mode at HARD mode as that shown in the period between the point A and the point B. After B, the piston strokes in the compression direction to return the initial position. In such case, the damping mode is set at SOFT mode for effectively absorbing the vibration energy as shown in the period between the point B and a point C. At the point C, variation rate $\Delta P$ in the compression mode reaches a value greater than the predetermined value $P_{ref}$ to again causing switching of the damping mode from SOFT mode to HARD mode. Therefore, from the point C to a point D greater damping force against the piston stroke is generated. Similarly to the process set forth with respect to the point B, the variation rate $\Delta P$ becomes zero at the point D. Then, the damping mode is switched into SOFT mode from the HARD mode. By repeating the foregoing process, the damping modes are switched between HARD mode and SOFT mode during the periods between the points D and E, points E and F and points F and G.

As will be appreciated herefrom, since the shown embodiment performs damping mode control in piston expansion and compression strokes independently of each other, effective suppression of piston strokes and absorption of the vibration energy can be achieved. Furthermore, in the shown embodiment, since the first piezoelectric element 60 is active for detecting fluid pressure in the lower working chamber 15 during piston compression stroke and the second piezoelectric element 90 is active for adjusting damping mode between the HARD mode and SOFT mode in the piston compression stroke; and since the second piezoelectric element 90 is active for detecting fluid pressure in the upper working chamber 14 during piston expansion stroke and the second piezoelectric element 60 is active for adjusting damping mode between the HARD mode and SOFT mode in the piston expansion stroke, monitoring of the fluid pressure and damping mode control can be performed independently at the same time.

Therefore, damping mode control with high precision and high response characteristics can be obtained.

FIGS. 9 and 10 show a modification of the foregoing preferred embodiment of the variable damping charactetristics shock absorber according to the present invention. The construction is particularly applicable for dual cylinder type shock absorber which has inner and outer cylinder tubes 3 and 2 coaxially arranged to each other for defining therebetween an annular fluid reservoir chamber 7. In the shown modification, singular piezoelectric element is provided in the piston assembly in a manner similar to the that in the piezoelectric element 90 and the piezoelectric element 60 and the associated slider 71 are neglected.

In order to perform adjustment of the damping characteristics in piston compression stroke, another piezoelectric element 170 is provided for cooperation with a bottom valve assembly 150 which is fitted on the bottom of the inner cylinder tube 3 together with a sleeve 152 and a bottom plate 151. A seal ring 178 is interposed between the sleeve 152 and the bottom plate 151.

The bottom valve assembly 150 has a valve body 160 which is secured onto the bottom of the inner cylinder tube 3. A valve port 162 and a communication orifice 164 are defined through the valve body 160. Both ends of the valve port 162 and the communication path 164 are respectively open to annular grooves 162a, 164a and 162b, 164b. The upper end of the annular groove 164a is closed by a spring-biased and annular ring form valve 161 is provided. The valve 161 is biased toward the opening end of the annular groove 164a by means of a coil spring 165 which is seated onto a valve seat member 266. The valve seat member 266 is fixed to a stem member of a valve seal body 169. On the other hand, the lower end opening of the annular groove 162b is closed by a disc valve member 163 which is also supported on the valve seat body 169. The valve seat body 169 is provided a seal ring 177 for establishing a liquid tight seal between the inner periphery of the sleeve 152.

The sleeve 152 is cooperative with the valve body 160 for defining an annular chamber 155a which is in communication with the annular groove 164b and opposes the annular groove 62b via the disc valve member 163. The annular chamber 155a is communicated with the fluid reservoir chamber 7 via a radial path 155.

The piezoelectric element 170 is mounted on an adjusting block 172 which is associated with an adjuster bolt 175 engaging with threaded hole 174 formed through the bottom of the sleeve 152. The adjuster bolt 175 and the threaded hole 174 form adjusting mechanism 173. The adjuster bolt 175 defines a center opening, to which a cap 176 with a seal ring 179 are engaged. The piezoelectric elements 170 is connected to the control unit 100 via a wiring harness 183 including cable codes 181 and 182.

With this construction, the piezoelectric element 170 is responsive to the fluid pressure in the lower working chamber 15 to produce the pressure indicative signal. On the other hand, the piezoelectric element 90 produces the fluid pressures in the higher and lower working chambers 14 and 15 for producing the pressure indicative signal. Therefore, by checking the pressure indicative signals Sp and Ss, the piston stoke direction can be discriminated.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A variable damping characteristics shock absorber comprising:
   a hollow cylinder defining therein an internal space;
   a piston assembly disposed within said internal space of said cylinder for defining first and second working chambers;
   a communication path means, incorporated in said piston assembly, for communicating said first and second working chambers, said communication means including a first path active during piston bounding stroke for establishing fluid communication between said first and second working chambers and a second path active during piston rebounding stroke for establishing fluid communication between said first and second working chambers;
   a first valve means associated with said first path, responsive to pressure difference between said first and second working chambers during piston bounding stroke, for forming a controlled area of a first fluid flow gap, which area of said first fluid flow gap being variable depending upon the magnitude of pressure difference between said first and second working chambers;
   a second valve means associated with said second path, responsive to pressure difference between said second and second working chambers during piston rebounding stroke, for forming a controlled area of a second fluid flow gap, which area of said second fluid flow gap being variable depending upon the magnitude of pressure difference between said first and second working chambers;
   a first piezoelectric element associated with said first valve means, for varying valve characteristics of said first valve, said first piezoelectric element being responsive to said pressure difference to produce a first pressure indicative signal having a first value which is variable depending upon the piston stroke direction;
   a second piezoelectric element associated with said second valve means, for varying valve characteristics of said second valve, said second piezoelectric element being responsive to said pressure difference to produce a second pressure indicative signal having a second value which is variable depending upon the piston stroke direction; and
   a control means, responsive to said first and second pressure indicative signals for discriminating piston stroke direction on the basis thereof and generating first and second control signals to be supplied to said first and second piezoelectric elements for obtaining desired damping characteristics depending upon piston stroke directions.

2. A shock absorber as set forth in claim 1, wherein first piezoelectric element is responsive to said pressure difference generated by said piston bounding stroke to produce a first level of said first pressure indicative signal and a responsive to said pressure difference generated by said piston rebounding stroke to produce a second level of said first pressure indicative signal, which second level is higher than said first level; and said second piezoelectric element is responsive to said pressure difference generated by said piston bounding stroke to produce a third level of second pressure indicative signal, which third level is lower than said first level, and responsive to said pressure difference generated by said piston rebounding stroke to produce a fourth level of said second pressure indicative signal, which fourth level is higher than said second level.

3. A shock absorber as set forth in claim 2, wherein at least one of said second level of said first pressure indicative signal and said third level of said second pressure indicative signal indicates zero level.

4. A shock absorber as set forth in claim 1, wherein said control means derives said first and second control signals so as to soften said damping characteristics during piston bounding stroke and to harden damping characteristics during piston rebounding stroke.

5. A shock absorber as set forth in claim 4, wherein said control means derives said first and second control signals irrespectively of each other so that damping characteristics in piston bounding stroke and rebounding stroke can be controlled independently of each other.

6. A variable damping characteristics shock absorber comprising:
a hollow cylinder defining therein an internal space;
a piston assembly disposed within said internal space of said cylinder for defining first and second working chambers;
a communication path means, incorporated in said piston assembly, for communicating said first and second working chambers, said communication means including a first path active during piston bounding stroke for establishing fluid communication between said first and second working chambers and a second path active during piston rebounding stroke for establishing fluid communication between said first and second working chambers;
a bottom valve assembly disposed between said second working chamber and a fluid reservoir chamber, said bottom valve means defining a third path for establishing fluid communication between said second chamber and said fluid reservoir chamber;
a first valve means associated with said third path, responsive to pressure difference between said first and second working chambers during piston bounding stroke, for forming a controlled area of a first fluid flow gap, which area of said first fluid flow gap being variable depending upon the magnitude of pressure difference between said first and second working chambers;
a second valve means associated with said second path, responsive to pressure difference between said second and second working chambers during piston rebounding stroke, for forming a controlled area of a second fluid flow gap, which area of said second fluid flow gap being variable depending upon the magnitude of pressure difference between said first and second working chambers;
a first piezoelectric element associated with said first valve means, for varying valve characteristics of said first valve, said first piezoelectric element being responsive to said pressure difference to produce a first pressure indicative signal having a first value which is variable depending upon the piston stroke direction;
a second piezoelectric element associated with said second valve means, for varying valve characteristics of said second valve, said second piezoelectric element being responsive to said pressure difference to produce a second pressure indicative signal having a second value which is variable depending upon the piston stroke direction; and
a control means, responsive to said first and second pressure indicative signals for discriminating piston stroke direction on the basis thereof and generating first and second control signals to be supplied to said first and second piezoelectric elements for obtaining desired damping characteristics depending upon piston stroke directions.

7. A shock absorber as set forth in claim 6, wherein first piezoelectric element is responsive to said pressure difference generated by said piston bounding stroke to produce a first level of said first pressure indicative signal and a responsive to said pressure difference generated by said piston rebounding stroke to produce a second level of said first pressure indicative signal, which second level is higher than said first level; and said second piezoelectric element is responsive to said pressure difference generated by said piston bounding stroke to produce a third level of second pressure indicative signal, which third level is lower than said first level, and responsive to said pressure difference generated by said piston rebounding stroke to produce a fourth level of said second pressure indicative signal, which fourth level is higher than said second level.

8. A shock absorber as set forth in claim 2, wherein at least one of said second level of said first pressure indicative signal and said third level of said second pressure indicative signal indicates zero level.

9. A shock absorber as set forth in claim 6, wherein said control means derives said first and second control signals so as to soften said damping characteristics during piston bounding stroke and to harden damping characteristics during piston rebounding stroke.

10. A shock absorber as set forth in claim 9, wherein said control means derives said first and second control signals irrespectively of each other so that damping characteristics in piston bounding stroke and rebounding stroke can be controlled independently of each other.

* * * * *